United States Patent [19]

Shimomura et al.

[11] 3,839,772
[45] Oct. 8, 1974

[54] CUTTING TOOL WITH ADJUSTABLE AND REPLACEABLE CUTTING TIPS

[75] Inventors: Hiroshi Shimomura, Tokyo; Tatsuo Suganami, Kawasaki, both of Japan

[73] Assignee: Mitsubishi Kinzoku Kogyo Kabushiki Kaisha, Tokyo-To, Japan

[22] Filed: July 31, 1973

[21] Appl. No.: 384,201

[30] Foreign Application Priority Data
Aug. 8, 1972  Japan.............................. 47-78804

[52] U.S. Cl............................................. 29/105 A
[51] Int. Cl............................................. B26d 1/12
[58] Field of Search................ 29/96, 105 R, 105 A

[56] References Cited
UNITED STATES PATENTS
2,805,467  9/1957  Greenleaf.......................... 29/96 X
3,359,612  12/1967  Mina................................ 29/105 A FOREIGN PATENTS OR APPLICATIONS
1,166,591  3/1964  Germany.......................... 29/105 A
1,502,096  12/1965  Germany.......................... 29/105 A

*Primary Examiner*—Harrison L. Hinson
*Attorney, Agent, or Firm*—Wenderoth, Lind & Ponack

[57] ABSTRACT

An adjustable cutting tool comprises a cylindrical tool body having several seats disposed with spacings around an outer peripheral part of the tool body, the same number of blade blocks each held in a respective seat, several cutting blade tips mounted on respective blade blocks, an adjusting device for adjustably moving each blade block along guide walls of its seat for adjustment of the position of the cutting edge of the cutting blade tip, a lever member for applying continuous spring force to each blade block toward the adjusting device thereby to prevent backlash, and a securing bolt for positively securing each blade block to the tool body with a compressed spring interposed therebetween.

9 Claims, 8 Drawing Figures

CUTTING TOOL WITH ADJUSTABLE AND REPLACEABLE CUTTING TIPS

BACKGROUND OF THE INVENTION

This invention relates generally to machine tools and tool parts thereof. More particularly, the invention relates to cutting tools of the type sometimes referred to a "throw-away" type having replaceable cutting blades whose cutting edge positions are adjustable.

In known cutting tools of this type for finish machining, ordinary replaceable cutting blade tips and wiper tips of special shape fabricated with high precision are used together, and the wiper tips are set to project by distances of the order of from 0.03 to 0.08 mm outward beyond the ordinary replaceable tips. However, in the assembly of these wiper tips and ordinary replaceable tips in a cutting tool, the work of adjusting the positions of all cutting edges requires a high degree of skill and much time. Furthermore, since finish machining is carried out with the wiper tips in relatively projecting state, the wear of these tips is severe, and these tips become unusable after a short period of use.

SUMMARY OF THE INVENTION

It is an object of this invention to overcome the above described difficulties encountered in the prior art and to provide an adjustable cutting tool wherein adjustments of the cutting edge precision and dimensional precision can be carried out in a short time.

According to this invention, briefly summarized, there is provide an adjustable cutting tool comprising a tool body having a plurality of seats each defined by guide wall surfaces, a plurality of blade blocks each held against the guide wall surfaces of a respective seat, a plurality of replaceable cutting blade tips each mounted on a respective blade block, adjusting means adapted to act on and cause each blade block to slide along the guide wall surfaces for adjustment of the position of the cutting edge of the cutting blade tip, backlash preventing means comprising a biasing member for imparting a force due to an elastic structure to each blade block in a direction to force the block positively, without play, against the adjusting means, securing means for positively fixing each blade block thus adjusted to the tool body, and spring means for imparting a retaining force to the blade block toward the guide wall surface even when said securing means is slightly loosened preparatory to adjustment of the blade block.

The nature, principle, and utility of this invention will be more clearly apparent from the following detailed description when read in conjunction with the accompanying drawings, in which like parts are designated by like reference numerals.

DETAILED DESCRIPTION

Figure 1:
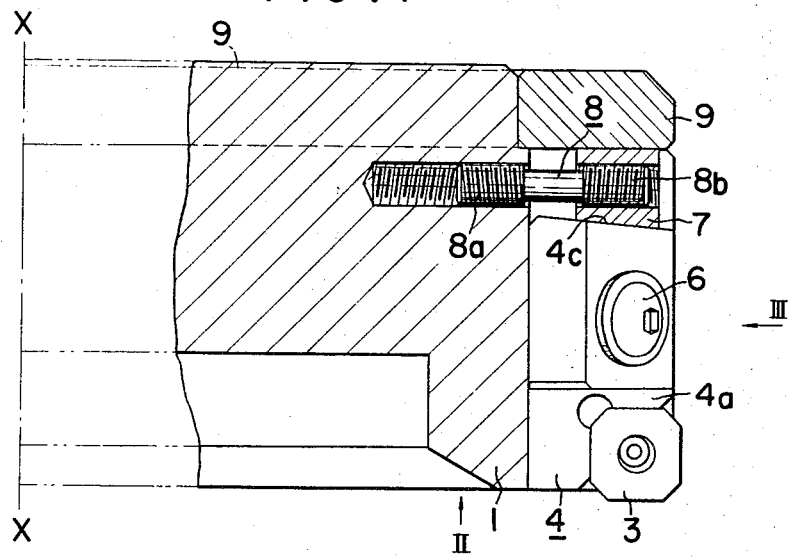
FIG. 1 is a sectional view of a part of one example of the adjustable face milling tool according to this invention.

Referring first to FIG. 1, there is shown, in section, the outer peripheral portion of an adjustable milling cutter according to the invention. The principal structural part of this milling cutter is a tool body 1 having a substantially cylindrical overall shape and adapted to support cutting tools such as cutting blades of the "throw-away" type, for example. This tool body 1 is further adapted to be mounted coaxially on an arbor or spindle of a milling machine and be driven thereby in rotation about its axis X—X.

Figure 2:
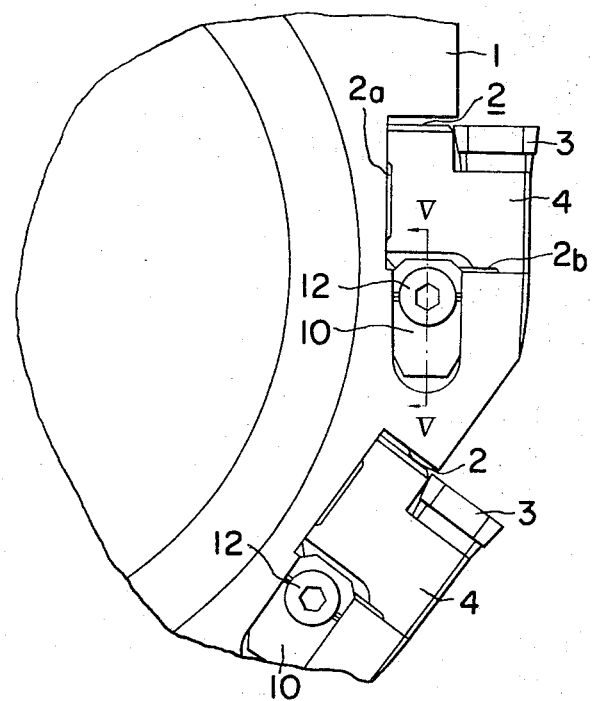
FIG. 2 is a view taken in the arrow direction II in FIG. 1.
Figure 4:
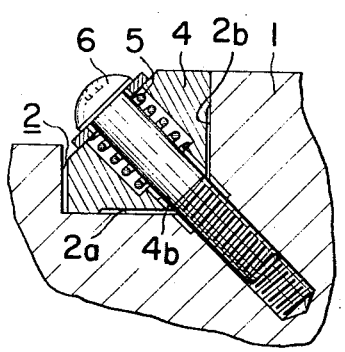
FIG. 4 is a section taken along the plane indicated by line IV—IV in FIG. 3 and viewed in the arrow direction.

As shown in FIGS. 2 and 4, the tool body 1 is provided around its outer periphery with a plurality of seat recesses 2 spaced therearound in the circumferential direction. These seat recesses 2 are provided for receiving and rigidly holding therein respective blade blocks 4 for rigidly holding in turn respective cutting blade tips 3, each seat recess having guide wall surfaces 2a and 2b which are parallel to the axis X—X and are substantially perpendicular to each other, and which function to positively fix the respective blade block 4 against movement in all directions perpendicular to the axis X—X.

Each blade block 4 has a front end part 4a to which is rigidly fixed a cutting tip such as, for example, a "throw-away" or replaceable cutting tip 3. Each blade block 4 is seated on the corresponding wall surfaces 2a and 2b and thus held thereagainst by a blade block securing bolt 6 assembled with a compression coil spring 5, the bolt 6 passing through a through hole 4b formed in the blade block 4.

Figure 3:
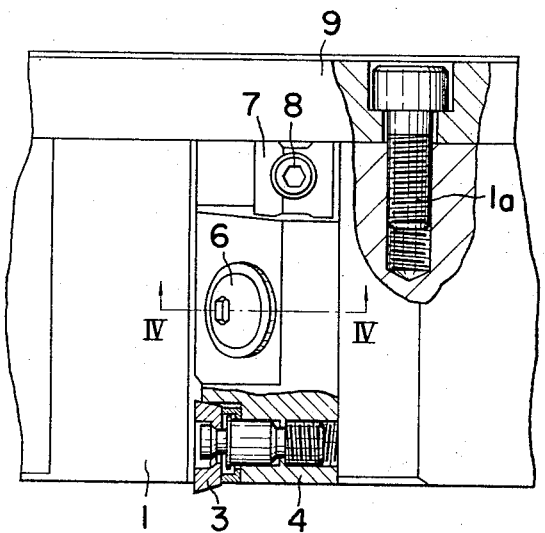
FIG. 3 is a view taken in the arrow direction III in FIG. 1.

An adjusting wedge 7 contacts the rear surface 4c of each blade block to cause it to slide in adjustable forward and rearward movement. This adjusting wedge 7 is connected to the tool body 1 by a double screw 8 having a right-hand screw 8a screwed into a tapped hole in the tool body 1 and a left-hand screw 8b screwed into a tapped hole in the wedge 7. A back-up ring 9 for positioning the adjusting wedge 7 and, at the same time, backing up the cutting force toward the front is secured to the tool body 1 by means of screws 1a as shown in FIG. 3.

Figure 5:
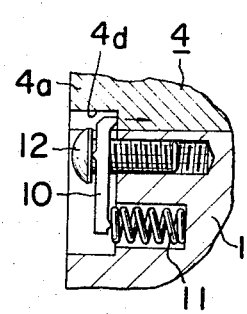
FIG. 5 is a section taken along the plane indicated by line V—V in FIG. 2 and viewed in the arrow direction.

At the front part 4a of each blade block 4, there is provided a ledge or stepped part 4d, with which a lever member 10 is caused to engage as indicated in FIGS. 2 and 5. At the same time, there is provided blade block prepressing and adjusting means comprising a compression spring 11 for pressing against the lever member and a lever member holding screw 12 passed through a hole in the lver member 10 and screwed into the tool body 1. In this manner, backlash which would other wise occur at the time the blade block 4 is caused to slide for adjustment is prevented.

Figure 6:
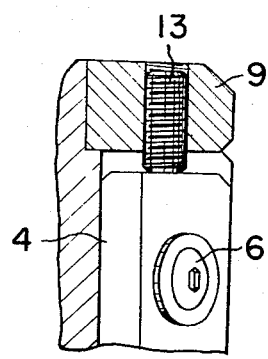
FIG. 6 is a section showing another example of means for adjusting the blade block shown in FIG. 1.
Figure 7:
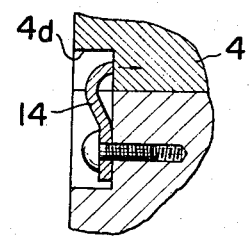
FIG. 7 is a section showing another example of the blade block pressing means shown in FIG. 5.
Figure 8:
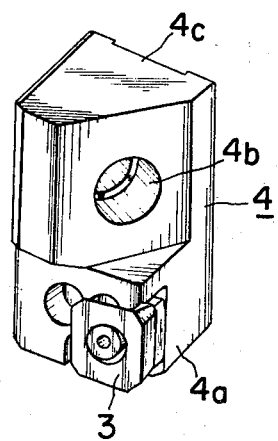
FIG. 8 is a perspective view of the blade block.

While a face milling cutter of adjustable face cutting blade type is illustrated in the accompanying drawing, the invention can be applied similarly with equal effectiveness to throw-away boring cutters of the adjustable peripheral cutting blade type. Furthermore, it is also possible to use an adjusting screw 13 as shown in FIG. 6 or some other means for adjustably shifting each blade block 4 instead of an adjusting wedge 7. Instead of the lever member 10 and the elastic member 11 for blade block prepressing and adjusting, an elastic lever plate 14 as shown in FIG. 7 or some other prepressing means can be used.

The adjustable milling cutter of the above described structural organization has the following features of function, adjustment, and use. The lever member 10 is fitted against the stepped part 4d of the front part 4a of each blade block 4 to impart prepressure, and then the blade block securing bolt 6 is loosened within the range of effectiveness of the resilient force of the spring 5. Next, the double screw 8 for holding the adjusting wedge 7 at the rear end of the blade block 4 is turned to shift the adjusting wedge 7, whereupon the blade block 4 is forced to slide along the wall surfaces 2a and 2b, whereby adjustment of the cutting edge position of the cutting tip at the head of the blade block is accomplished.

During this adjustment, backlash is completely eliminated by the mounting bolt 6 and the elastic member 11 acting on the lever member 10 or the elastic lever plate 14, whereby rapid and highly accurate adjustment of the cutting blade is possible. Upon completion of the adjustment procedure, the securing bolt 6 is tightened to fix the blade block 4 to the tool body 1. When all of the blade blocks 4 have been thus adjusted, the milling cutter can be used for milling.

As described above, this invention provides an adjustable milling cutter wherein blade blocks 4 mounted on a tool body 1 are shifted in sliding movement by adjusting wedges 7, adjusting screws 13, or some other suitable adjusting means. Accordingly, the procedure of adjusting the positions of the cutting edges of the cutting tips is much easier than that in known milling cutters for finish cutting. Furthermore, since backlash is completely eliminated at the time of sliding adjustment of the blade blocks 4 by the action of the elastic members 11 or 14, fluctuations in precision during adjustment of the cutting blade position cannot occur, and highly accurate adjustment of the cutting blade positions is made possible.

What is claimed is:

1. An adjustable cutting tool comprising: a tool body (1) having a plurality of seats (2) each defined by guide wall surfaces (2a, 2b); a plurality of blade blocks (4) each held against the guide wall surfaces of a respective seat; a plurality of replaceable cutting blade tips (3) each mounted on a respective blade block; adjusting means (7, 8 or 13) adapted to act on and cause each blade block to slide along the guide wall surfaces for adjustment of the cutting edge position of the cutting blade tip; backlash preventing means comprising a biasing member (10 or 14) for imparting a force due to deformation of an elastic structure (11 or 14) to each blade block in a direction to force the block positively, without play, against the adjusting means; securing means (6) for positively fixing each blade block thus adjusted to the tool body; and spring means (5) for imparting a retaining force to the blade block toward the guide wall surface even when said securing means is slightly loosened preparatory to adjustment of the blade block.

2. An adjustable cutting tool as claimed in claim 1 in which the tool body has a shape substantially of a circular cylinder rotating about its centerline during cutting operation, and said seats are disposed with spacings around an outer peripheral part of the tool body.

3. An adjustable cutting tool as claimed in claim 1 in which said adjusting means comprises, for each blade block, a wedge member (7) having an inclined wedge face in sliding contact with a mating inclined surface of said blade block and screw means (8) for adjustably moving the wedge member in wedge action to adjustably more said blade block.

4. An adjustable cutting tool as claimed in claim 1 in which said adjusting means comprises, for each blade block, an adjusting screw (13) thread engaged with an integral part of the tool body and abutting at one end against a surface of said blade block.

5. An adjustable cutting tool as claimed in claim 1 in which said biasing member of the backlash preventing means is a lever member (10) pivotally supported at a point intermediate between two ends thereof by the tool body and bearing at its one end against a stepped part (4d) of each blade block and at its other end against a spring (11) exerting thereon a counter spring force.

6. An adjustable cutting tool as claimed in claim 1 in which the said biasing member of the backlash preventing member is an elastic lever plate (14) anchored at its proximal end to the tool body and functioning as a leaf-spring to bear at its distal end with spring force on a stepped part (4d) of each blade block.

7. An adjustable cutting tool as claimed in claim 2 in which said guide walls of each seat are substantially perpendicular to each other and substantially parallel to said centerline of the tool body, whereby each blade block is adjustably moved in a direction substantially parallel to said centerline.

8. An adjustable cutting tool as claimed in claim 7 which is adapted for face milling.

9. An adjustable cutting tool as claimed in claim 1 in which said securing means comprises a blade block securing bolt (6) having a head, an unthreaded shank passed through each blade block, and a threaded part screwed into the tool body, said head bearing firmly against said blade block when the bolt is tightened, and said spring means comprises a compression spring (5) disposed around said unthreaded shank and within a countersunk hole in the blade block and abutting at one end against said head of the bolt and at the other end against the bottom of said countersunk hole, said compression spring functioning to impart a retaining force to the blade block toward the guide wall surface even when the bolt is slightly loosened preparatory to adjustment of the blade block.

* * * * *